United States Patent [19]

Agrillo

[11] Patent Number: 4,758,013
[45] Date of Patent: Jul. 19, 1988

[54] HAND CRANK WHEELCHAIR DRIVE

[76] Inventor: Timothy P. Agrillo, 6201 SW. 9th Pl., North Lauderdale, Fla. 33068

[21] Appl. No.: 940,412

[22] Filed: Dec. 11, 1986

Related U.S. Application Data

[63] Continuation-in-part of Ser. No. 842,155, Mar. 21, 1986, abandoned.

[51] Int. Cl.$^4$ .......................... H61G 5/02; B62M 1/14
[52] U.S. Cl. .................. 280/242 WC; 192/5; 192/6 R; 192/94; 280/250; 280/289 WC
[58] Field of Search ............... 280/242 WC, 289 WC, 280/242 R, 249, 250, 259, 260, 261, 236, 237, 246, 253, 255; 192/5 R, 6 R, 94; 74/547

[56] References Cited

U.S. PATENT DOCUMENTS

| | | | |
|---|---|---|---|
| 765,945 | 7/1904 | Weiler | 192/5 |
| 1,018,471 | 2/1912 | Zimmerman | 192/6 R |
| 2,410,785 | 11/1946 | Hood | 192/6 R |
| 3,670,856 | 6/1972 | Segawa | 192/6 A |
| 4,506,901 | 3/1985 | Tosti | 280/242 WC |

Primary Examiner—John J. Love
Assistant Examiner—Mitchell J. Hill
Attorney, Agent, or Firm—Alvin S. Blum

[57] ABSTRACT

A hand crank powered wheelchair with forward, coast, reverse, and braking capability. The wheelchair has a left and right hand crank. Each hand crank is used to independently control the two rear wheels. A clutch and brake is contained in the hub of each rear wheel. The clutch drives wheel forward when hand crank is rotated forward and allows wheel to coast when hand crank stops rotation. A reverse enable lever selects brake or reverse mode. When in brake mode minimal energy applied to crank in the reverse direction will slow or stop rear wheel. When in reverse mode, brake acts as clutch, allowing reverse rotation of hand crank to drive rear wheel backward. The drive may include a gear shift mechanism. Drives of the invention may be applied to other wheeled vehicles such as delivery tricycles.

29 Claims, 7 Drawing Sheets

FIG. 5
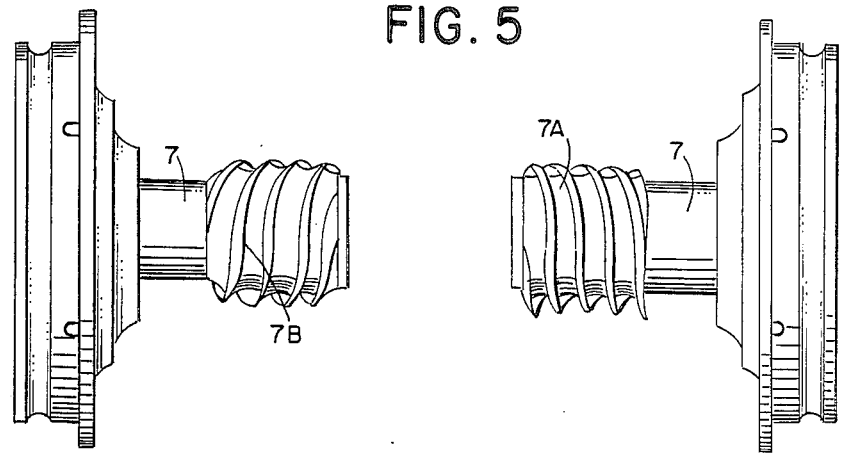
FIG. 6
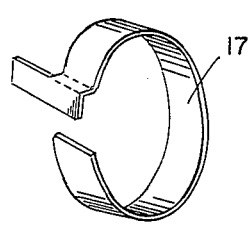
FIG. 7
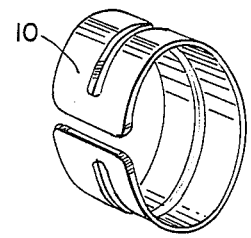
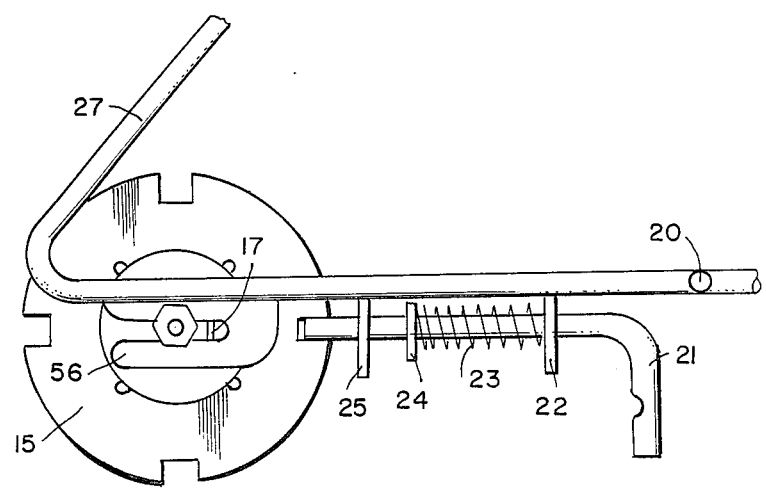
FIG. 8

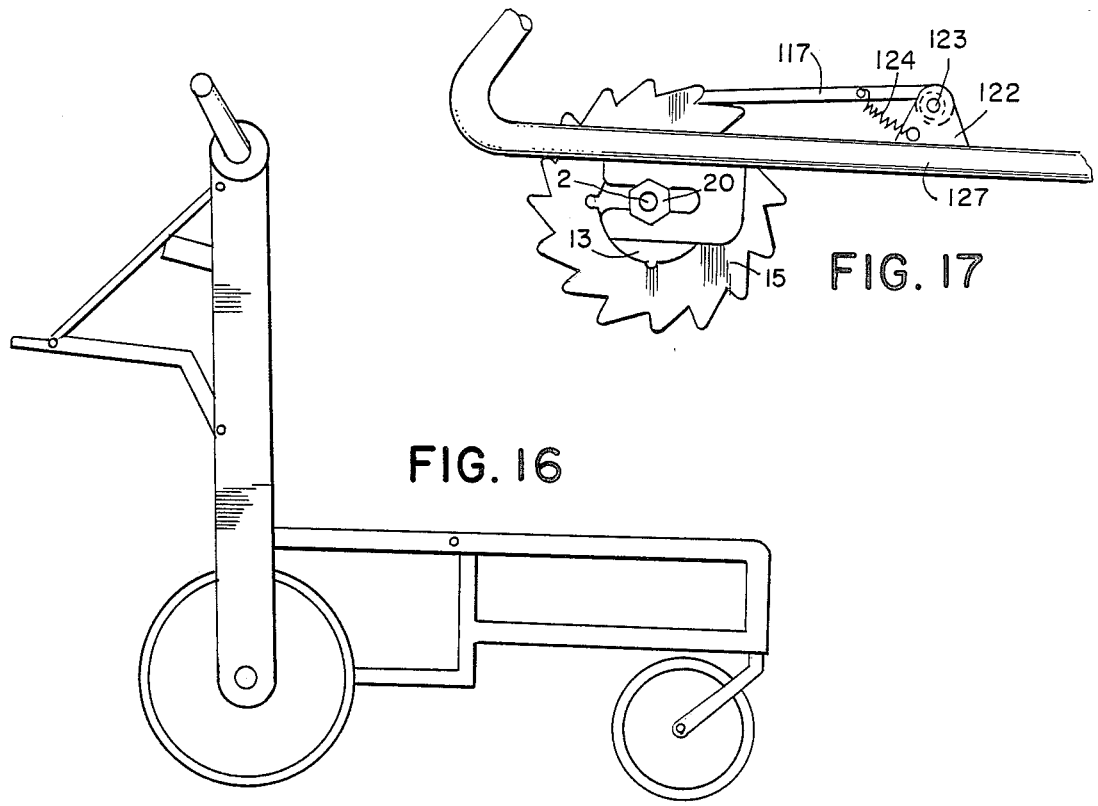
FIG. 17
FIG. 16
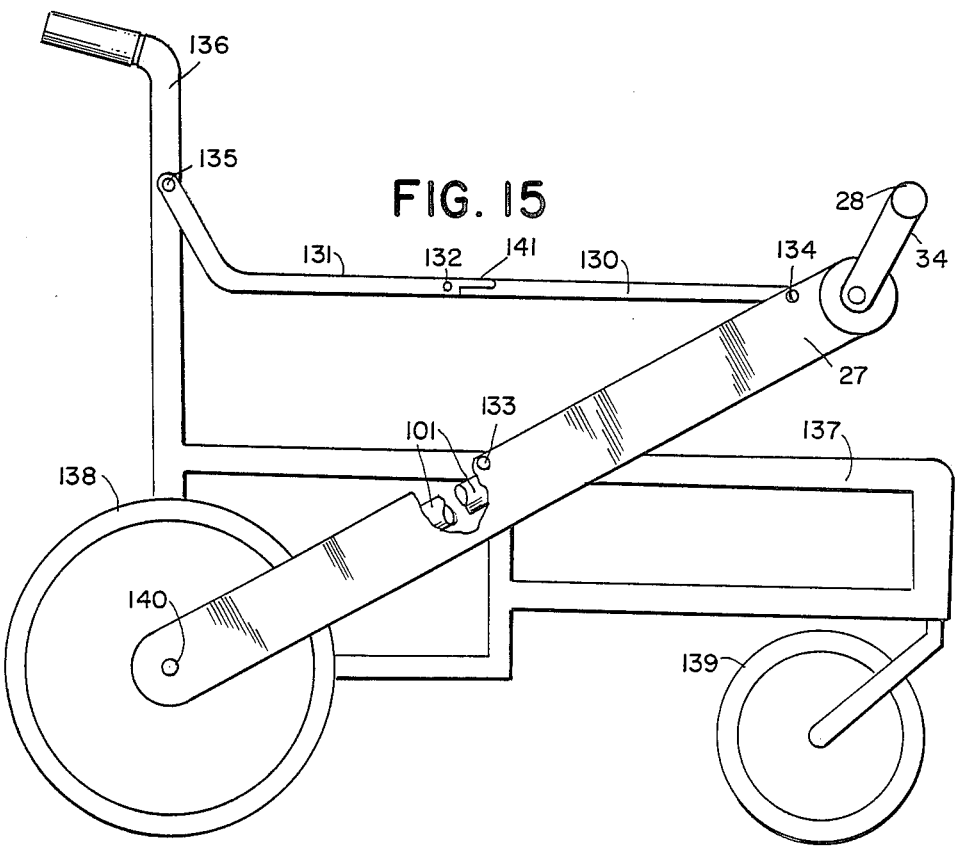
FIG. 15

HAND CRANK WHEELCHAIR DRIVE

This application is a continuation-in-part of copening Ser. No. 842,155 filed 3/21/86, incorporated herein by reference now abandoned.

FIELD OF THE INVENTION

This invention relates to wheeled vehicles and more specifically to hand crank drives for wheeled vehicles.

BACKGROUND OF THE INVENTION

Hand propelled vehicles for operation by a seated person commonly employ large diameter rear wheels with circular hand rails attached thereto for propulsion and steering. These have certain disadvantages. The wheel must be large to provide sufficient leverage, but the large wheel makes transport and storage awkward. The position of the arms during the power stroke prevents optimum use of the muscles, and requires an undesirable wrist twisting motion. Furthermore, while the hand is returning from the power stroke, the wheel on that side is not powered, wasting the energy of that motion, and it is uncontrolled. It may roll backward or turn, forcing the user to synchronize the power strokes bilaterally even though this may be uncomfortable or incompatible with a particular disability.

Hand crank drives are well known in the prior art in patents issued as far back as 1900 (Golata—U.S. Pat. No. 646,069) and as recent as 1985 (Tosti—U.S. Pat. No. 4,506,901). They use chain and sprocket crank drive that can provide continuous power. Dumont, U.S. Pat. No. 4,274,651 introduced a means for disengaging the crank arm by an outward motion so that the wheel can turn free of the crank arm for coasting and the cranks can be engaged at angles to one another that are most comfortable.

However the drive and clutch mechanism taught fail to satisfy the unique requirements of the wheelchair user. Dumont's clutch requires moving the handle in an outward arc. There may not be enough width clearance to perform this maneuver. It requires use of muscles not ordinarily developed by the user. Furthermore, the clutching mechanism abruptly engages the crank to the moving wheel, exerting a sudden load on the arms. Furthermore the braking actions taught by all the prior art wheelchair drives put all of the kinetic energy of motion onto the arms, which may not have normal strength.

Drive Structures that minimize sudden and excessive forces on the arms and optimize operation for the constraints imposed by physiologic limitations of a seated user will finally make hand crank drives practicable almost a century after their introduction. It is desirable, therefor, to provide an improved hand crank drive for wheeled vehicles that will overcome the many disadvantages of the prior art.

SUMMARY OF THE INVENTION

The present invention provides improved hand crank drives for wheeled vehicles and improved hand crank driven wheelchairs. An object of the invention is to provide a drive that operates on a substantially continuous manual power stroke that substantially avoids loss of power and control during its operation.

Another object is to provide a hand crank drive that can be retrofitted to conventional wheelchairs to incorporate the advantages of the invention.

Another object is to provide a drive with a coaster brake that permits free wheeling of the driven wheels and engages the crank when the speed of rotation of the crank corresponds to that of the driven wheel so that engagement does not apply an abrupt force to the crank and the user's hand when the chair is rolling.

It is a further object of the invention to provide a drive wherein engagement, disengagement and braking operations are performed by the same arm motions using the same muscle groups as those used in propulsion.

It is yet another object of the invention to provide a drive with more confortable arm positions and motions.

It is yet another object of the invention to provide a drive permitting a smaller diameter driven wheel without sacrificing leverage for less awkward transport and storage.

It is yet another object of the invention to provide a drive with braking action wherein the stopping forces are transmitted to the framework of the wheelchair with the kinetic energy of motion being expended in frictional elements instead of in the arm muscles of the user.

It is yet another object of the invention to provide a drive with an optional reversing operation that permits hand cranking in a reverse mode when forward motion has ceased.

It is yet another object of the invention to provide a drive as above described that optionally includes gear shifting means to change the gear ratio between crank and driven wheel to permit selection of optimum leverage for a particular situation.

It is yet another object of the invention to provide a drive as above described with folding means to permit the crank and drive to fold toward the rear to facilitate entry and egress by the user.

It is yet another object of the invention to provide a drive as described above that includes chain and sprocket drive means.

It is yet another object of the invention to provide a drive as described above that includes gears and a journalled rotating drive shaft.

These and other objects, advantages, and features of the invention will be apparent from the description of preferred embodiments which is set forth in the specification.

BRIEF DESCRIPTION OF THE DRAWINGS

FIG. 5 is a front elevation of left and right drive gears.
FIG. 6 is a perspective view of the friction spring clip for the brake locking disc.
FIG. 7 is a perspective view of the friction spring clip for the inner drive gear.
FIG. 8 is a side elevation view of the brake lock disc assembly.

FIG. 15 is a side elevation view of a wheelchair with folding armrest and drive extended.

FIG. 16 is a side elevation view of the chair of FIG. 15 with armrest and drive folded for easy access.

FIG. 17 is a side elevation view of a ratchet type brake and reversing disc mechanism.

DETAILED DESCRIPTION OF PREFERRED EMBODIMENTS

Figure 11:
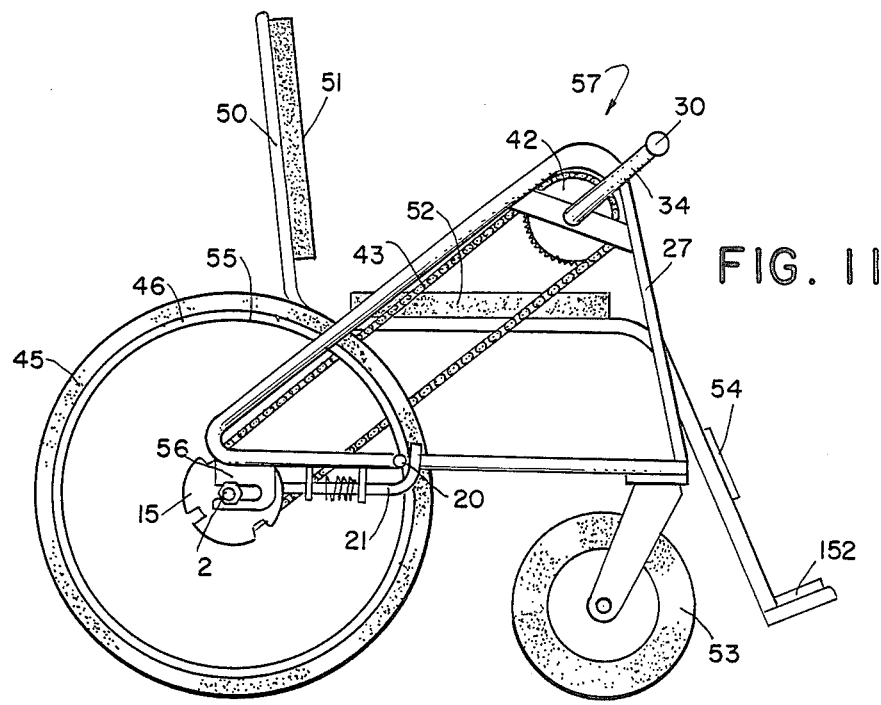
FIG. 11 is a side elevation view of a chain drive wheelchair of the invention.
Figure 12:
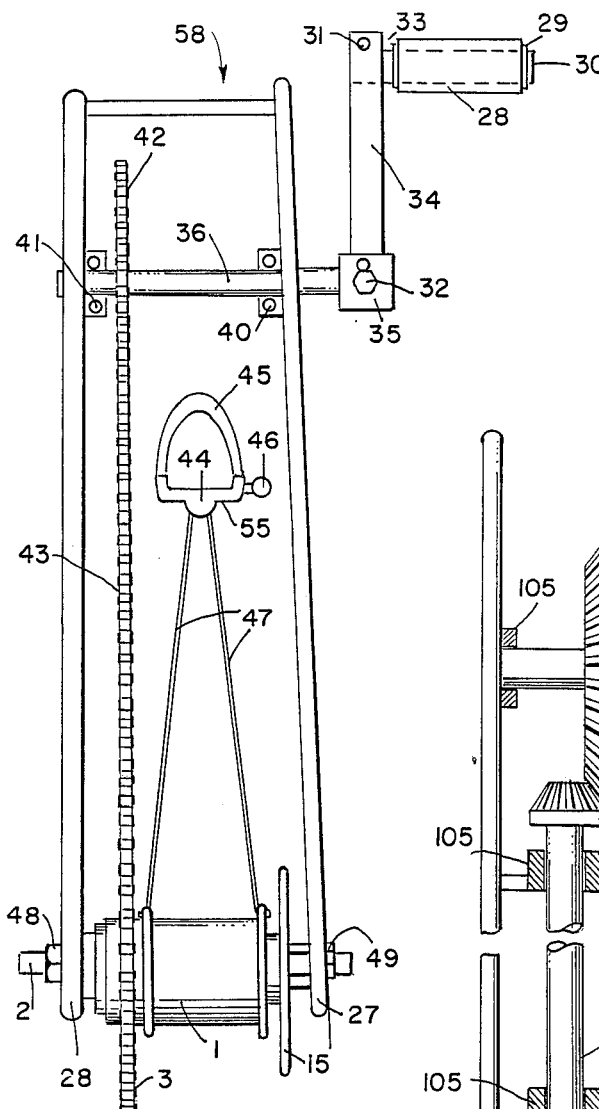
FIG. 12 is a front elevation view of the chain drive mechanism.

Referring first to FIG. 11, a hand crank wheelchair 57 of the invention has four wheels, two large rear wheel assemblies 55 and two front swivel castors 53. Each wheel assembly 55 (FIG. 12) is mounted between outer wheel supports 27 and inner wheel supports 28. Each drive assembly 58 has hand cranks 34 driving drive sprockets 42 which drive chains 43 which drive driven sprockets 3 (FIG. 4) and wheelhubs 1.

Between both frame supports 50 (FIGS. 11 and 12), which are securely fastened to each inner wheel support 28, a seat back 51 and a seat bottom 52 are mounted. The foot rest 152 and the leg rest 54 are also mounted between the two frame supports 50.

There are two ways to propel the wheelchair 57. The conventional method of push rings 46, or rotation of hand crank 34 operating sprocket 42, chain 43 and driven sprocket 3.

The action of the hub 1 depends on the action of the driven sprocket 3. During forward rotation of the driven sprocket 3, the hub 1 is forced to rotate forward. When the driven sprocket 3 stops rotation the hub 1 is allowed to coast (FREEWHEEL). While the hub 1 is rotating forward, minimal energy applied to the driven sprocket 3, in the reverse direction will activate mechanical friction brake thus slowing or stopping the hub 1. Once hub 1 has stopped forward rotation, reverse rotation of the driven sprocket 3 will force the hub 1 to rotate in the reverse direction when reverse enable lever 21 (FIGS. 8, 11) is disengaged from the brake locking disc 15.

To operate forward drive the lower driven sprocket 3 (FIG. 4) must rotate forward faster than hub 1. The driven sprocket 3 is keyed to the threaded drive gear 7 and held in place by clip 6. The threaded drive gear 7 rotates on axle using bearing elements 4, 5 and 8. The threaded drive gear 7, rotating forward, threads into the drive cone 9, pulling the drive cone 9 towards the cone shaped inner hub surface 1A. Friction clip 10 (FIGS. 4, 7) keeps a small amount of friction between the inner brake cone 11 and drive cone 9. The small amount of friction is used to prevent the drive cone 9 from rotating with the threaded drive gear 7 until the drive cone 9 meets the cone shaped inner hub surface 1A. The friction generated from the toothed section of the forward rotating drive cone 9 meeting cone shaped inner hub surface 1A will force hub 1 to rotate forward. During this time the following parts are rotating forward on bearings 4, 5, 8 and 14; hub 1, threaded drive gear 7, drive cone 9, driven sprocket 3, clip 6.

To coast, the driven sprocket 3 must be held from rotating. This will stop rotation of threaded drive gear 7. Friction between the drive cone 9 and cone shaped inner hub surface 1A is utilized to slightly unthread forward rotating drive cone 9 from stationary threaded drive gear 7, thus releasing drive cone 9 from cone shaped inner hub surface 1A. Friction released between drive cone 9 and cone shaped inner hub surface 1A allows hub 1 to coast or freewheel on bearings 8 and 14.

Figure 1:
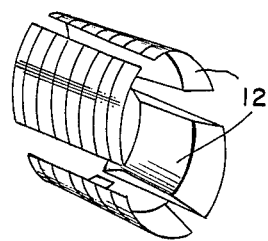
FIG. 1 is a perspective view of the brake shoes.
Figure 2:
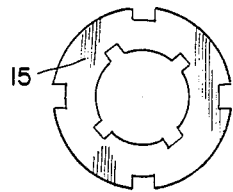
FIG. 2 is a side view of the brake locking disc.
Figure 4:
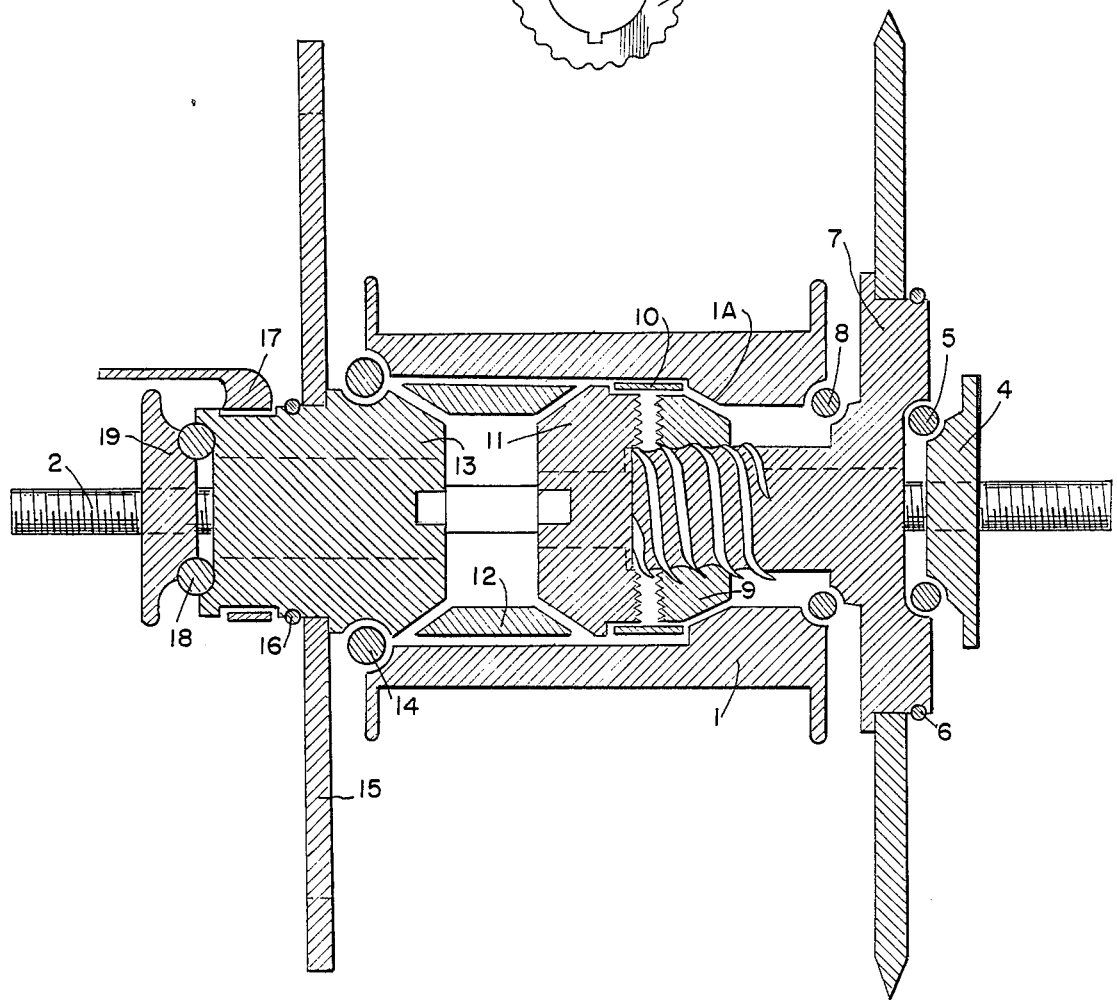
FIG. 4 is a cross sectional view of the hub assembly.
Figure 9:
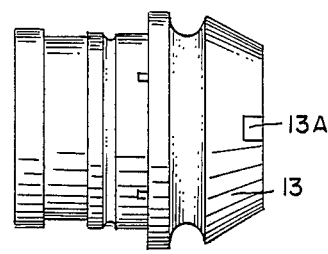
FIG. 9 is a front elevation view of the inner drive cone assembly with friction clip.
Figure 10:
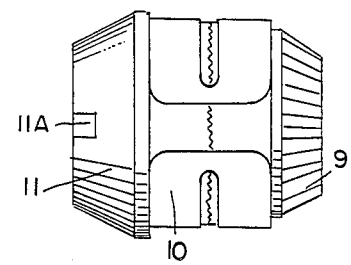
FIG. 10 is a front elevation view of the brake cone.

To operate mechanical friction brake, the driven sprocket 3 must rotate slightly in the reverse direction while hub 1 is rotating forward. This action further unthreads the drive cone 9 from the threaded drive gear 7, forcing the drive cone 9 toward the inner brake cone 11. As the drive cone 9 reaches the toothed section of the inner brake cone 11, the drive cone 9 will be held from rotating. The more reverse energy applied to the threaded drive gear 7, the closer the inner brake cone 11 will move toward the outer brake cone 13. The four square elevations 11A, 13A (FIGS. 9, 10) prevent the four brake shoes 12 (FIGS. 1, 4) from rotating relative to the inner and outer brake cones 11 and 13 (FIG. 4). To prevent forward rotation of the four brake shoes 12 and the inner and outer brake cones 11 and 13, a brake locking disc 15 is mounted to the outer disc cone 13 (FIGS. 4, 8, 11, 12). The brake locking disc 15 is keyed and held in place by clip 16, and friction spring clip 17 (FIGS. 4, 6) prevents free rotation.

Referring now to FIGS. 8 and 11, the reverse enable lever 21, riding on guides 25, 22 held by frame member 127 with spring assembly 23, 24, is maintained in the reverse enable position when held on pin 20. The brake locking disc is locked by the lever 21 engaging a slot 300 in the disc 15 in the brake enable position.

Figure 3:
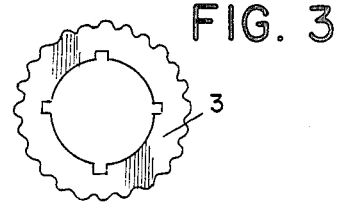
FIG. 3 is a side view of driven sprocket.

When lever 21 is in the reverse enable position, reverse rotation of the drive sprocket 3 will cause the hub 1 to rotate in the reverse direction. Reverse rotation of the driven sprocket will force the threaded drive gear 7 (FIG. 4) to rotate in the reverse direction. As the drive gear 7 rotates in the reverse direction, the drive cone 9, will unthread from the threaded drive gear 7. This will cause the drive cone 9 to meet with the inner brake cone 11. Further reverse rotation of the driven sprocket 3 will push inner brake well towards the outer brake cone 13 (FIGS. 3 and 4), previously discussed as the inner brake cone 11 moves closer toward the outer brake cone 13. The brake shoes 12 (FIGS. 3 and 4) are forced outward, and this creates great friction between the four brake shoes 12 and the hub 1. Further rotation of the driven sprocket 1 will cause the following parts to rotate in the reverse direction while riding on bearing elements 4, 5 and 18, 19: clip 6, threaded drive gear 7, bearing 8, drive cone 9, clip 10, inner brake cone 11, brake shoes 12, hub 1, outer brake cone 13, bearing 14, brake locking disc 15 and clip 16.

FIG. 17 shows an alternative embodiment of the invention, wherein the brake locking disc 315 has the shape of a ratchet gear. A pawl 117 is pivotally mounted on frame member 127 by support 122 at pivot 123. Spring 124 holds the pawl down so that the pawl will engage the teeth of ratchet gear brake locking disc 315, permitting the disc to freely rotate counterclockwise and preventing clockwise rotation by ratchet action. Therefor, braking action occurs as long as the wheel and hub are rolling forward (clockwise) and the crank is being reversed because the disc's clockwise rotation is prevented by the pawl. However, when forward rotation ceases, the disc 15 is forced counterclockwise, and the hub and wheel turn in the reverse direction. This is especially useful in make tight turns and maneuvering in confined spaces such as bathrooms.

The kinetic energy of the forward motion is dissipated as heat in the friction of the brake linings during braking, and the forces of braking are transmitted from the hub to the wheelchair framework and not to the arms of the user as in the prior art, permitting effective braking with weak arms.

Because forward drive action will only occur when the crank, drive and driven sprockets are rotating faster than the hub, the crank engagement in the forward motion from freewheeling will be quite gentle and no strain on the user. The above described coaster brake mechanism is well known in the bicycle art, but has not been applied to wheelchairs. The disengagement of the brake to permit reversing is novel, and may be applied to tricycles and other wheel vehicles as well.

Figure 13:
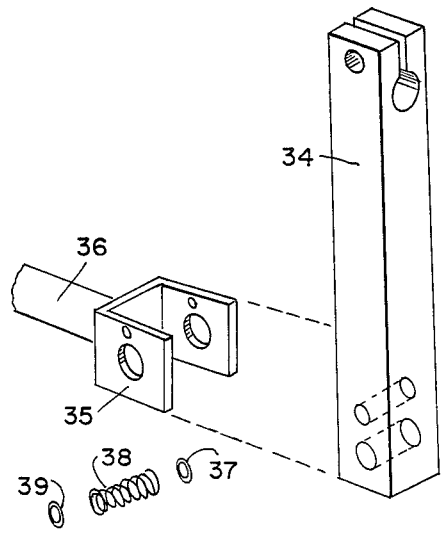
FIG. 13 is an exploded perspective view of the crank handle.

Using bearings 40 and 41 (FIGS. 12, 13) the crank shaft 36 is rotatably mounted between outer wheel support 27 and inner wheel support 28. The hand crank 34 is pivotally connected to crank shaft 36 and can be locked in place using spring 38 and detent balls 37 and 39. The detent balls 37 and 39, when forced outward by spring 38, will lock into detent holes made in crank housing 35. Using a bolt 31, the handle shaft 30 is clamped to the crank 34. Th handle grip 28, made of a low friction material, is loosely fitted around handle shaft 30 to allow free rotation. Clips 29 and 33 position handle grip 28 to handle shaft 30. Folding the crank inward permits passage through narrow doorways.

Figure 14:
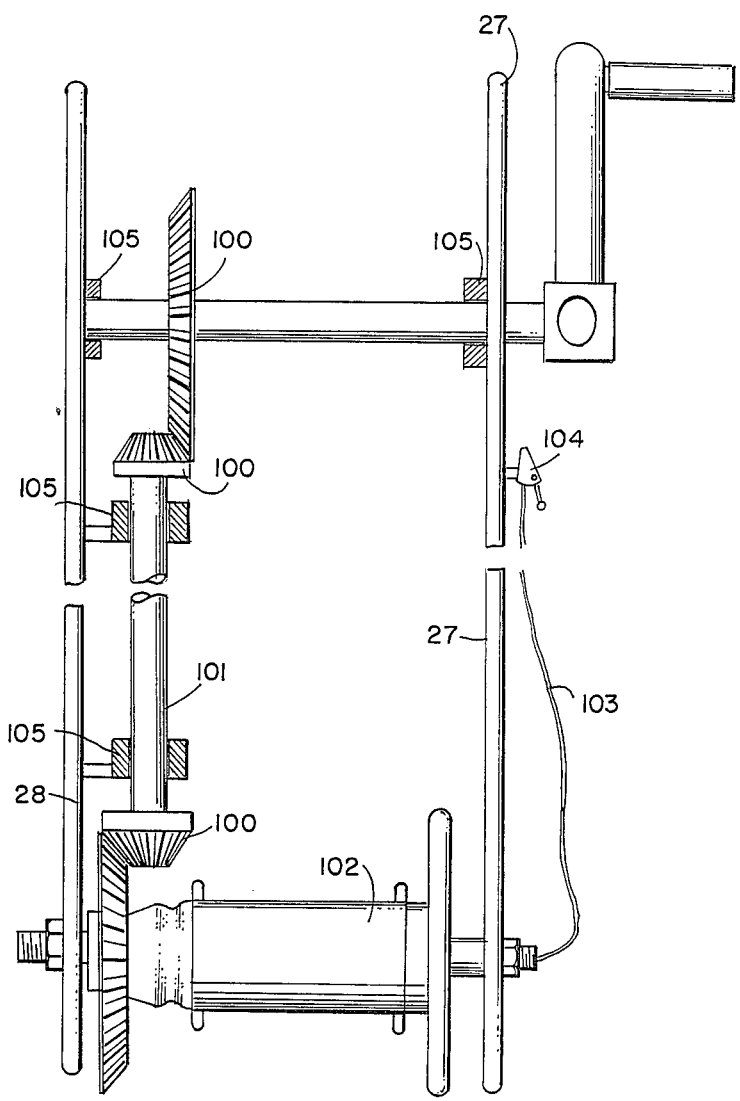
FIG. 14 is a front elevation view of the bevel gear and driveshaft mechanism with gear shifting.

FIG. 14 shows an alternative embodiment of the invention, wherein bevel gears 100 and drive shaft 101, riding in bearings 105, replace the sprockets and chain drive. Hub 102 contains a coaster brake with gear change mechanism of the type exemplified by the Shimano gear for bicycles such as disclosed in U.S. Pat. No. 3,670,856. Push-pull cable 103 affects the gear changing. It is controlled by gear change lever 104 on outer support member 27.

Chain Tension Adjustment

Hub 1 (FIGS. 8, 12) is rotatably mounted to axle 2. Axle 2 is secured to slots in slotted support members 56 in both the inner wheel support 28 and the outer wheel support 27. To adjust the tension on drive chain 43, the axle 2 is moved forward or backward in the slots in the slotted wheel support members 56 after loosening the axle nuts 48 and 49. Conventional push rings 46 are secured to wheel 44. Wheel 44 is connected to hub 1 by spokes 47. Tire 45 is mounted on wheel 44.

FIGS. 15 and 16 show a wheelchair of the invention with a driveshaft 101 revealed by breaking away part of outer wheel support 27. The hand crank drive mechanism including the hand crank 34 with handle 28 and the bevel gears and drive shaft (concealed behind outer wheel support 27) are held in place at the pivot point 140 at the axle and at locking pin 133 affixed to horizontal frame member 137. A folding armrest comprising first portion 131 and second portion 130 with pivots 135, 134 and 132 locks in place with overhang 141 when pressure is applied from above as shown in FIG. 15. When force is applied from below to the armrest, after releasing locking pin 133, the crank 34 and drive assembly and wheel support 27 fold upwards, pivotting about the pivot point 140 to the configuration shown in FIG. 16. This makes it possible for the user to enter or leave the wheelchair from the side without interference by the drive or the armrest. Because this embodiment also uses a smaller rear wheel, the user can slide in and out the side without lifting himself over a large wheel. Furthermore the small wheel makes storage and transport (as in an automobile) more practicable.

The invention may be practiced by providing a wheelchair as disclosed herein or by retrofitting an existing wheelchair with the unique drive mechanism of the invention. Although the disclosure features the preferred swivel castor front wheels and rear wheel drives, the invention can be practiced as well with swivel castor rear wheels and front wheel drives. The usual leg and foot rests and other amenities well known in the art may be employed in conjunction with the invention as well.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A hand propelled wheelchair with wheels and hand crank drive trains, comprising:
   rotary hand crank means disposed at each side of said wheelchair in a position to be comfortably operated by its occupant;
   rotary motion drive means connected to and actuated by said crank means for transmitting motion from said crank means to said wheels;
   a pair of driven wheels connected to and driven by said drive means; coaster brake means in said drive train, said coaster brake means including means for driving said driven wheels to move said wheelchair forward when said hand crank means are rotated in a first, forward direction at a rate of at least as fast as the rate of said driven wheels in a forward direction, and including means for disengaging said driven wheels to coast disengaged from said crank means when said crank means are rotated to a lesser rate and also when said crank means are not rotated, and including means for braking said driven wheels when said crank means are rotated in a second, reverse direction, wherein the braking forces of the forward motion are transmitted to the framework of said wheelchair; and manual push ring means connected to said driven wheels for manually rotating said wheels directly and independently in forward or reverse direction independent of said drive means.

2. In the wheelchair of claim 1, said drive trains further including means for rotating said driven wheels in a reverse direction when said crank means is rotated in said reverse direction and the forward motion of said driven wheels has ceased.

3. In the wheelchair of claim 2, said drive trans including ratchet means for reversing.

4. In the wheelchair of claim 2, said drive trains including manual control means for reversing.

5. In the wheelchair of claim 1, said drive means including sprocket and chain means.

6. In the wheelchair of claim 1, said drive means including gears and driveshaft means.

7. In the wheelchair or claim 1, said drive trains including gear changing means for changing the ratio of rate of rotation between said crank means and said driven wheels for optimizing operation for particular applications such as uphill, fatigue and the like.

8. In the wheelchair of claim 2, said drive trains including gear changing means for changing the ratio of rate of rotation between said crank means and said driven wheels for optimizing operation for particular applications such as uphill, fatigue and the like.

9. In the wheelchair of claim 2, said drive trains including means for rotating said drive trains into a non-operating position wherein said crank means is away from said side of said wheelchair for facilitating entrance and exit from said side of said wheelchair.

10. In the wheelchair of claim 9, said means for rotating said drive train including folding armrest means for further facilitating access to said wheelchair by removing said armrest from said side.

11. In the wheelchair of claim 1, said drive trains including means for rotating said drive trains into a non-operating position wherein said crank means is away from said side of said wheelchair for facilitating entrance and exit from said side of said wheelchair.

12. In the wheelchair of claim 11, said means for rotating said drive train including folding armrest means for further facilitating access to said wheelchair by removing said armrest from said side.

13. Hand crank drive trains for wheelchairs with wheels and manual push rings connected to two of said wheels for manually rotating said wheels directly and independently in forward or reverse direction independent of said hand crank drive trains, comprising:
   rotary hand crank means for disposing at each side of said wheelchair in a position to be comfortably operated by its occupant;
   rotary motion drive means connected to and actuated by said crank means for transmitting motion from said crank means to said wheels;
   driven wheels connected to and driven by said drive means; coaster brake means in said drive train, said coaster brake means including means for driving said driven wheels to move said wheelchair forward when said crank means are rotated in a first, forward direction at a rate at least as fast as the rate of said driven wheels in a forward direction, and including means for disengaging said driven wheels to coast disengaged from said crank means when said crank means are rotated at a lesser rate and also when said crank means are not rotated, including means for braking said driven wheels when said crank means are rotated in a second, reverse direction, wherein the braking forces of the forward motion are transmitted to the framework of said wheelchair.

14. The drive trains of claim 13, further including means for rotating said driven wheels in a reverse direction when said crank means is rotated in said reverse direction and the forward motion of said driven wheel has ceased.

15. The drive trains of claim 14 including ratchet means for reversing direction.

16. The drive trains of claim 14 including manual control means for reversing direction.

17. In the drive trains of claim 13, said drive means including sprocket and chain means.

18. In the drive trains of claim 13, said drive means including gears and driveshaft means.

19. The drive trains of claim 13 including gear changing means for changing the ratio of rate of rotation between said crank means and said driven wheels for optimizing for particular applications such as uphill, fatigue and the like.

20. The drive trains of claim 14 including gear changing means for changing the ratio of rate of rotation between said crank means and said driven wheels for optimizing operation for particular applications such as uphill, fatigue and the like.

21. The drive trains of claim 14 including means for rotating said drive trains into a non-operating position wherein said crank means is away from said side of said wheelchair for facilitating entrance and exit from said side of said wheelchair.

22. The drive trains of claim 21, said means for rotating said drive train including folding armrest means for further facilitating access to said wheelchair by removing said armrest from said side.

23. The drive trains of claim 13, including means for rotating said drive trains into a non-operating position wherein said crank means is away from said side of said cheelchair for facilitating entrance and exit from said side of said wheelchair.

24. A hand propelled wheelchair with wheels and hand crank drive trains, comprising:
   rotary hand crank means disposed at each side of said wheelchair in a position to be comfortably operated by its occupant;
   rotary motion drive means connected to and actuated by said crank means for transmitting motion from said crank means to said wheels;
   a pair of driven wheels connected to and driven by said drive means; coaster brake means in said drive train, said coaster brake means including means for driving said driven wheels to move said wheelchair forward when said crank means are rotated in a first, forward direction at a rate at least as fast as the rate of said driven wheels in a forward direction, and including means for disengaging said driven wheels to coast disengaged from said crank means when said crank means are rotated at a lesser rate and also when said crank means are not rotated, and including means for braking said driven wheels when said crank means are rotated in a second, reverse direction, wherein the braking forces of the forward motion are transmitted to the framework of said wheelchair and;
   reversing means for rotating said driven wheels in a reverse direction when said crank means is rotated in said reverse direction and the forward motion of said wheelchair has ceased.

25. In the wheelchair of claim 24, said reversing means including ratchet means for reversing.

26. In the wheelchair of claim 24, said reversing means including manual control means for reversing.

27. In the wheelchair of claim 24, said drive trains including gear changing means for changing the ratio of rate of rotation between said crank means and said driven wheels for optimizing operation for particular applications such as uphill, fatigue and the like.

28. In the wheelchair of claim 24, said drive trains including means for rotating said drive trains into a non-operating position wherein said crank means rotated away from said side of said wheelchair for facilitating entrance and exit from said side of said wheelchair.

29. In the wheelchair of claim 28, said means for rotating said drive train including folding armrest means for further facilitating access to said wheelchair by folding said armrest away from said side.

* * * * *